United States Patent
Cordes et al.

(10) Patent No.: US 9,732,854 B2
(45) Date of Patent: Aug. 15, 2017

(54) SEALING SYSTEM FOR A VACUUM CLEANER SUCTION PIPE

(71) Applicant: fischer Rohrtechnik GmbH, Achern-Fautenbach (DE)

(72) Inventors: Martin Cordes, Sundern (DE); Stephan Cordes, Arnsberg (DE)

(73) Assignee: fischer Rohrtechnik GmbH, Achern-Fautenbach (DE)

( * ) Notice: Subject to any disclaimer, the term of this patent is extended or adjusted under 35 U.S.C. 154(b) by 182 days.

(21) Appl. No.: 13/733,276

(22) Filed: Jan. 3, 2013

(65) Prior Publication Data
US 2013/0175767 A1  Jul. 11, 2013

(30) Foreign Application Priority Data
Jan. 10, 2012  (DE) .......... 10 2012 000 282

(51) Int. Cl.
*A47L 9/24* (2006.01)
*F16J 15/02* (2006.01)
*F16J 15/10* (2006.01)

(52) U.S. Cl.
CPC ............ *F16J 15/02* (2013.01); *A47L 9/244* (2013.01); *F16J 15/104* (2013.01)

(58) Field of Classification Search
CPC .......... F16J 15/02; F16J 15/104; A47L 9/244
USPC .... 277/603, 606, 607, 608, 626, 627; 285/7, 285/80, 123.13, 351
See application file for complete search history.

(56) References Cited

U.S. PATENT DOCUMENTS

| | | | | |
|---|---|---|---|---|
| 2,064,397 | A * | 12/1936 | White | 285/7 |
| 2,245,151 | A * | 6/1941 | Martinet | 285/7 |
| 3,015,510 | A * | 1/1962 | Schuyler | F16L 17/025 |
| | | | | 277/615 |
| 3,185,491 | A * | 5/1965 | Anderson | 277/603 |
| 3,493,237 | A * | 2/1970 | Kleindienst | 277/602 |
| 3,510,139 | A * | 5/1970 | Potter | 277/603 |
| 3,967,829 | A * | 7/1976 | Rogers | 277/589 |
| 4,331,351 | A * | 5/1982 | Sobczyk | 285/7 |
| 4,558,889 | A * | 12/1985 | Gans | 285/7 |
| 4,625,998 | A * | 12/1986 | Draudt et al. | 285/7 |
| 5,031,266 | A | 7/1991 | Tillman et al. | |
| 6,370,730 | B1 * | 4/2002 | Young et al. | 15/327.1 |
| 7,168,127 | B2 * | 1/2007 | Genoa et al. | 15/314 |
| 7,494,161 | B2 * | 2/2009 | Kanai et al. | 285/403 |
| 7,891,710 | B2 * | 2/2011 | Pedersen et al. | 285/319 |
| 2005/0212220 | A1 * | 9/2005 | Graham | 277/602 |
| 2006/0202433 | A1 * | 9/2006 | Costa et al. | 277/602 |
| 2007/0180651 | A1 | 8/2007 | Muhlenkamp | |
| 2008/0272594 | A1 * | 11/2008 | Phillipps | 285/328 |

(Continued)

FOREIGN PATENT DOCUMENTS

DE  201 14 394 U1  11/2001
DE  101 42 684 C1  11/2002

(Continued)

*Primary Examiner* — Eugene G Byrd
(74) *Attorney, Agent, or Firm* — David S. Safran

(57) ABSTRACT

A sealing system (1) for sealing between an inner pipe and an outer pipe of a telescoping vacuum cleaner suction pipe, which ensures maximum possible sealing with simultaneously simple operator controllability of the vacuum cleaner suction pipe, has at least one annular base body (2) of a first material and an annular sealing body (3) of a second material on the base body (2).

13 Claims, 3 Drawing Sheets

(56) References Cited

U.S. PATENT DOCUMENTS

2011/0018257 A1    1/2011  Jeon et al.
2011/0290711 A1*  12/2011  Katayama et al. ...... 210/321.83

FOREIGN PATENT DOCUMENTS

| DE | 10 2006 030 138 B3 | 10/2007 |
|----|--------------------|---------|
| DE | 10 2010 023 920 A1 | 12/2011 |
| EP |        2 484 260 A1 |  8/2012 |
| WO |       2007/045033 A1 |  4/2007 |

* cited by examiner

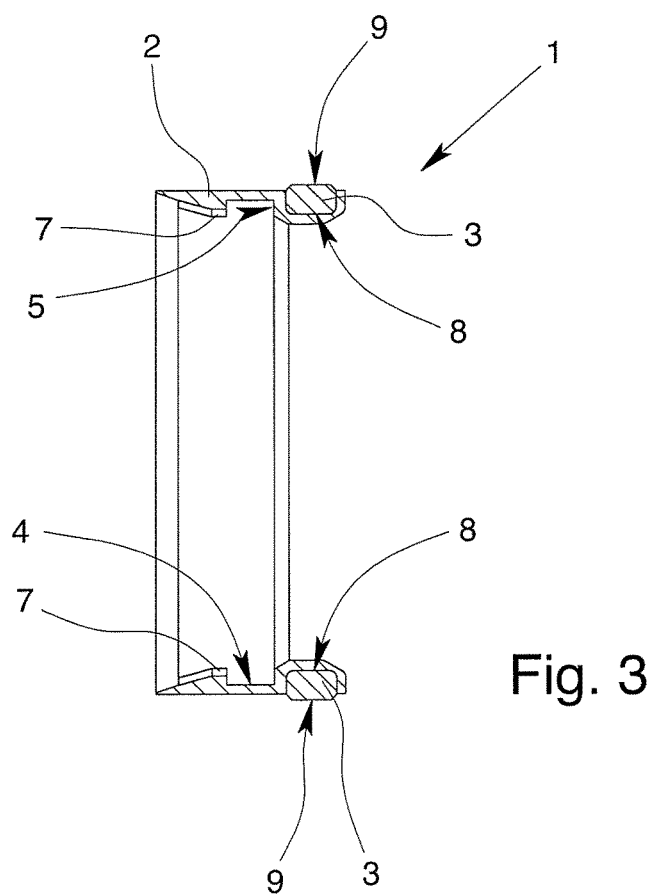
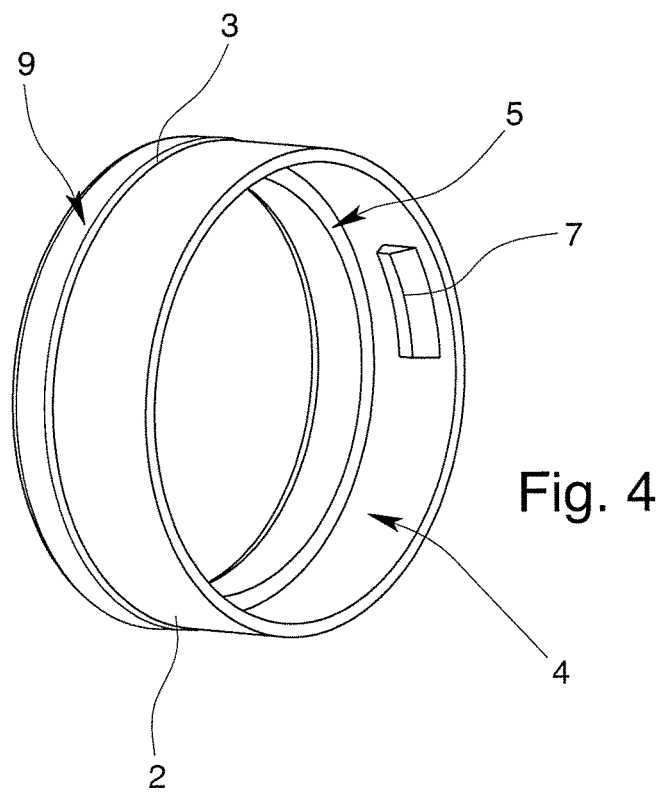

SEALING SYSTEM FOR A VACUUM CLEANER SUCTION PIPE

BACKGROUND OF THE INVENTION

Field of the Invention

The invention relates to a sealing system for sealing between an inner pipe and an outer pipe of a telescoping vacuum cleaner suction pipe, comprising at least one annular base body of a first material.

Description of Related Art

Vacuum cleaner suction pipes whose length can be adjusted by displacing an inner pipe relative to an outer pipe are known in the prior art in a host of configurations. The inner pipe and the outer pipe form a suction channel between, for example, a floor nozzle and the suction hose of the vacuum cleaner. The vacuum cleaner causes a negative pressure which induces the suction effect on the floor nozzle. To prevent penetration of secondary air into the suction channel in the operating state, and thus, to increase the energy efficiency of the vacuum cleaner, sealing of the transition region between the inner pipe and the outer pipe is necessary. The inner pipe is routed within the outer pipe here.

Conventionally, the outer contour of the inner pipe corresponds roughly to the inner contour of the outer pipe so that only a small annular gap remains which must be sealed. Here, the challenge always arises that the displacement of the inner pipe relative to the outer pipe with the best possible sealing must be able to be take place with little effort and in a simple manner in order to not adversely affect the operator controllability of the vacuum cleaner suction pipe. Sealing systems known from the prior art for vacuum cleaner suction pipes have the disadvantage that either the requirements for the tightness of the system are not achieved or simple operator controllability of the vacuum cleaner suction pipe is not adequately ensured.

SUMMARY OF THE INVENTION

Therefore, a primary object of this invention is to devise a sealing system which ensures maximum possible sealing with simultaneously simple operator controllability of the vacuum cleaner suction pipe.

The indicated object is achieved in that there is an annular sealing body of a second material on the base body. The sealing body is located on the base body so that the base body and the sealing body form a unit. Both the base body and also the sealing body are made annular; this means that with respect to their longitudinal extension they have at least in part an annularly closed contour. In addition to circular contours, for the sealing body and the base body any closed contours are acceptable, oval contours or circular contours with flattened regions being preferred.

The base body has a length orthogonal to its contour so that the base body extends at least partially coaxially to the middle axis of the inner pipe or the outer pipe in the mounted state. The base body preferably has a shoulder on its inner periphery so that the sealing system can be slipped onto an inner pipe. In the mounted state, consequently, the sealing system, especially the base body, extends at least partially on the outer periphery of the inner pipe and thus between the inner pipe and the outer pipe. Preferably, the annular gap remaining between the inner pipe and outer pipe is at least partially filled by the material of the base body. The base body is used for stabilization when the inner pipe is displaced within the outer pipe. Furthermore, the minimum distance between the inner pipe and outer pipe is fixed by the base body. In addition, the base body is used preferably as a pull-out catch so that the inner pipe cannot be pulled unintentionally out of the outer pipe.

The sealing body is used for sealing the transition—the annular gap—between the inner pipe and the outer pipe so that secondary air cannot penetrate through the annular gap into the suction channel of the vacuum cleaner suction pipe. The sealing body equalizes dimensional tolerances of the outer pipe by the sealing body resting flexibly against the inner periphery of the outer pipe.

The base body and the sealing body are produced from different materials—a first material for the base body and a second material for the sealing body so that the respective material can be matched individually to the function of the part—the sealing system or the base body. "Different materials" mean simply that the materials are not identical, but can originate from the same material category or material supergroup. For example, the base body and the sealing body can be produced from two different elastomers. A slightly different composition of the materials is sufficient, in the context of the invention the materials being different if for example, a pure material is intended for the base body and the same material however with a granulate dispersed in it is intended for the sealing body.

The invention has the advantage that by using different materials for the different parts of the sealing system each part is matched to its primary function within the sealing system, as a result of which almost complete sealing is ensured with simultaneously easy operator controllability when the vacuum cleaner suction pipe is telescoped.

According to a first configuration, it has been found to be advantageous if the sealing body is located at least partially on the outer periphery of the base body. The sealing body is applied to the outer surface, specifically to the outer periphery of the annular base body so that the sealing body extends at least partially on the outer periphery of the base body. The extension of the sealing body in the mounted state in the axial direction of the vacuum cleaner suction pipe—the width of the sealing body—is smaller than the extension in the base body in the same direction—the width of the base body, the width of the sealing body corresponding roughly to ⅓ of the width of the base body. The sealing body is preferably located in one end region of the base body, preferably in the end region of the base body which in the mounted state slipped onto the inner pipe is facing away from the inner pipe.

According to another advantageous configuration, it is provided that the base body has at least one shoulder on an outer periphery and that the sealing body is located in the shoulder. The shoulder constitutes a recess from the outer surface of the base body so that the shoulder has at least a smaller periphery than the directly surrounding remainder of the base body. The shoulder is located preferably in an end region of the base body which, in the mounted state slipped onto the inner pipe, faces away from the inner pipe. The sealing body is located in this shoulder; this means that the sealing body is connected to the base body in the region of the shoulder. For a completely round base body, the shoulder is intended, for example, as a region with reduced diameter in the end region of the base body. The height of the shoulder corresponds roughly to ⅕ of the width of the base body.

Furthermore, according to a next configuration, it has been found to be advantageous if the base body has a least one groove in an outer periphery and that the sealing body is located in the groove. The groove is provided in an outer periphery of the annular base body and is located preferably in an end region of the base body, preferably in the end region which faces away from the inner pipe in the mounted state slipped onto the inner pipe. The groove thus forms an annular recess which runs around the base body in the outer surface of the base body which is bordered on both sides by a groove flank. The groove flanks preferably have the same height and are used for stabilizing retention of the sealing body. Depending on the configuration, the material thickness of the base body is chosen such that the grove is provided only in the wall of the base body or alternatively such that the groove is visible as stamping on the inner surface of the base body. For the case in which the groove is stamped on the inner periphery of the base body, it is used preferably as a stop for an inner pipe which has been inserted into the base body. The inner pipe can subsequently be inserted into the base body until it adjoins the groove on the inner periphery with its entire face surface.

The sealing system is easily mounted if, according to another configuration, it is provided that the sealing body is located as a separate part on the base body. The base body and the sealing body are consequently present as separate parts before mounting of the sealing system and are joined into a sealing system by, for example, the sealing body being slipped onto the shoulder or placed into the groove. For mounting, especially into the groove, the sealing body is, for example, temporarily elastically stretched, its then moved again into an unstretched or slightly pretensioned state within the groove. The sealing body is attached, for example, as in the case of the groove via form-fit, alternatively or additionally, however, it is also provided that the sealing body is attached to the base body with an adhesive.

As an alternative to the preceding configuration, according to another configuration, it is provided that the sealing body is injected (injection molded) onto the base body. The sealing system is consequently produced by the sealing body being molded or injected onto the existing base body. The sealing body is thus originally molded on the existing base body by being placed, for example, in the groove or in the shoulder in a pasty or liquid state and being set there, preferably supported by a mold. In this way, for connection purposes, undercuts can also be made between the sealing body and the base body or the material of the sealing body can be used to fill regions of the base body.

For advantageous sealing of the vacuum cleaner suction pipe, it has been found to be advantageous if the sealing body has a sealing surface between the inner pipe and the outer pipe, especially if the sealing surface has a width between 0.5 mm and 3.0 mm. The sealing surface is formed by the sealing body and extends annually around the base body so that the annular gap between the inner pipe and outer pipe is completely sealed by the sealing body. The sealing body with its sealing surface adjoins the inner periphery of the outer pipe, and thus, seals the system. The sealing surface has a width between 0.5 mm and 3.0 mm in the unloaded state, width meaning the extension of the sealing surface in the axial direction of the inner pipe or the outer pipe in the mounted state. The width can be increased in the mounted state by the seal adjoining the inner periphery of the outer pipe, since the seal is preferably compressed in the mounted state in order to ensure reliable sealing. The width of the sealing surface corresponds preferably to the width of the sealing body.

Another configuration calls for the sealing body to have an essentially rectangular cross section. Due to the rectangular cross section, the sealing body can be easily fixed on the shoulder or in the groove and it has a sealing surface on its outer periphery facing away from the groove or the shoulder which corresponds to the width of the base body. The corner regions of the cross section are preferably rounded or have a bevel.

Furthermore, for advantageous sealing of the vacuum cleaner suction pipe, according to another configuration, it is provided that the sealing body has a flexible sealing lip between the inner pipe and the outer pipe. The sealing lip flexibly adjoins the inner periphery of the outer pipe so that, in case of irregularities, the sealing of the annular gap between the inner pipe and outer pipe by the sealing lip of the sealing body is ensured. The sealing lip is oriented, for example, at an angle of 90° relative to the outer periphery of the base body. The width of the sealing lip is preferably much smaller than the width of the sealing body.

According to one development, it is provided that the sealing lip is sloped, especially the sealing lip has a decreasing material thickness in the radial direction. Especially preferably, the sealing lip—proceeding from one end region of the base body—is sloped in the direction of the base body so that the sealing lip can flexibly yield in the direction of its slope and adjoins the inner surface of the outer pipe with a slight pretensioning. Due to the negative pressure which is formed by the vacuum cleaner during operation in the vacuum cleaner suction pipe, the sealing lip of the sealing body is drawn additionally against the inner wall of the outer pipe, as a result of which an additional contact pressure and sealing are achieved. If, for example, when the inner pipe is displaced relative to the outer pipe the annular gap between the inner pipe and outer pipe changes, the flexible sealing lip lines up in a manner that ensures reliable sealing. The sealing lip with increasing distance in the radial direction relative to the center axis of the base body has a decreasing material thickness so that the sealing lip tapers in the radial direction. In this way, the flexibility of the sealing lip is increased so that the sealing lip which is very thin in the end region also reliably conforms to slight irregularities.

Reliable sealing is also ensured according to a next configuration in that the largest outer contour of the sealing body is larger than the largest outer contour of the base body. This configuration ensures that the sealing body always reliably adjoins the inner contour of the outer pipe and causes a sealing action. Preferably, the largest outer contour of the sealing body is greater than the inner contour of the outer pipe, preferably larger by 0.1 mm to 0.3 mm, quite preferably by 0.2 mm. For circular contours, the diameter of the largest outer contour of the sealing body is greater than the inside diameter of the outer pipe. In the mounted state, the sealing body is compressed by the outer pipe so that an advantageous sealing action arises. Either the flexible sealing lip is pressed to the inside or the material of the sealing body is compressed or forced away to the sides. The contact pressure of the sealing body on the inner surface of the outer pipe advantageously seals the system. In this way, tolerances in the outer pipe can be equalized.

It has been found to be especially advantageous according to a last configuration if the material of the sealing body is softer than the material of the base body, especially if the base body is produced from polypropylene (PP) or polyethylene (PE) and the sealing body from a foam, a textile, a natural or synthetic rubber or a silicone. The base body is used to stabilize the connection between the inner pipe and the outer pipe and as a pull-out catch and spacer ring between the inner and outer pipe. For this reason, the material of the base body is more stable and thus supports the sealing body. The sealing body is used primarily to seal the remaining annular gap between the inner pipe and the outer pipe so that a softer material ensures contact of the sealing body, and thus, closing of the annular gap.

Advantageous materials for the base body are all plastics, especially polypropylene and polyethylene. The sealing body is advantageously produced from a foam or a textile. Suitable textiles are preferably a felt or a fiber material. When using rubbers, India rubber and the material chloroprene rubber (which is also known as neoprene) have proven advantageous. Furthermore, silicones have sufficient flexibility to ensure reliable sealing. Fundamentally, all elastomers are advantageously suited to ensure the sealing function between the inner pipe and outer pipe.

In particular, there is now a host of possibilities for embodying and developing the sealing system for a vacuum cleaner suction pipe as will be apparent from the following description of preferred exemplary embodiments in conjunction with the accompanying drawings.

BRIEF DESCRIPTION OF THE DRAWINGS

FIG. 3 is a sectional side view of another exemplary embodiment of a sealing system, FIG. 4 is a perspective view of the embodiment according to FIG. 3.

DETAILED DESCRIPTION OF THE INVENTION

Figure 1:
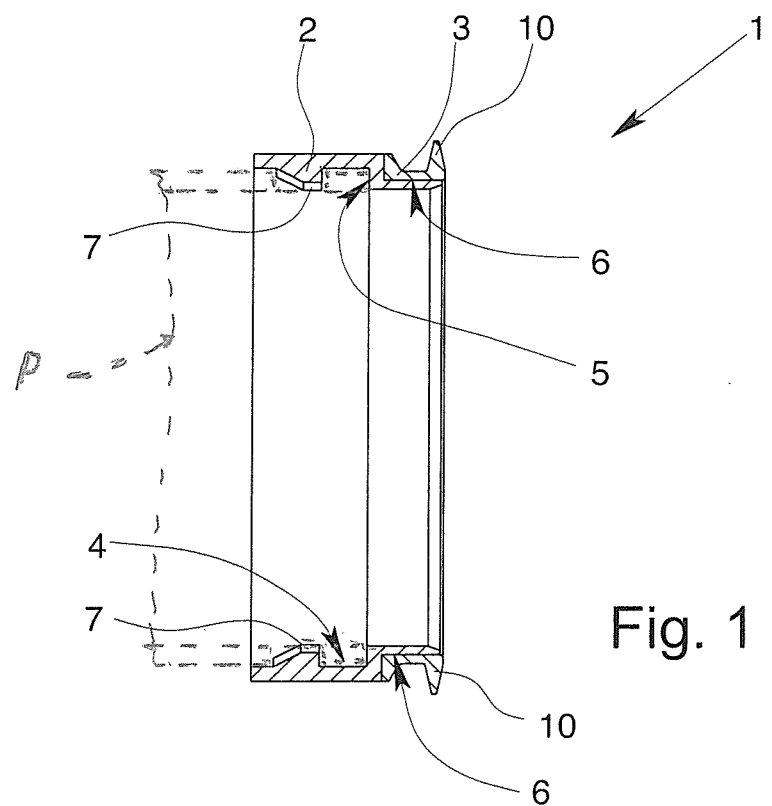
FIG. 1 is a sectional side view of an exemplary embodiment of a sealing system.

FIG. 1 shows an exemplary embodiment of a sealing system 1 for sealing between an inner pipe and an outer pipe of a telescoping vacuum cleaner suction pipe P (an end portion of which is shown in phantom outline). The sealing system 1 comprises an annular base body 2, the base body 2 being produced from a first material. The sealing system 1 also comprises an annular sealing body 3 which is located on the base body 2, the sealing body 3 being produced from a second material. The first material and the second material are different materials which however can originate from the same material super group.

The sealing body 3 is located on the base body 2 so that the base body 2 and the sealing body 3 form a unit, specifically the sealing system 1. The sealing body 3 extends partially on an outer periphery of the base body 2. Both the base body 2 and also the sealing body 3 have an annularly closed contour. The base body 2 on its inner periphery has an inner shoulder 4 so that the sealing system 1 can be slipped onto an inner pipe (in the direction from the left according to FIG. 1). until its end face fits on a stop 5. The stop 5 results from a shoulder 6 which is made in the outer periphery of the base body 2 and also forms the inner should 4 on the opposite side of stop 5. The sealing body 3 is located on the shoulder 6 so that the sealing body 3 is located on an outer periphery of the base body 2. The shoulder 6 constitutes an offset inward relative to the surface of the remaining outer periphery of the base body 2. The shoulder 6 is arranged here such that it is located in the end region of the base body 2 facing away from the inner pipe in the mounted state.

Figure 2:
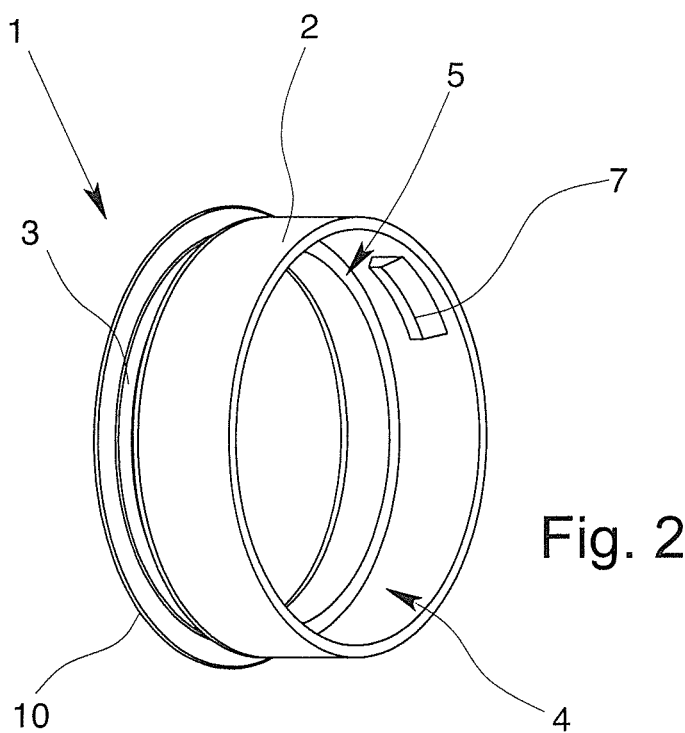
FIG. 2 is a perspective view of the embodiment according to FIG. 1.

FIG. 2 shows the exemplary embodiment according to FIG. 1 in a perspective view. The sealing system 1 with its base body 2 with the shoulder 4 can be slipped onto an inner pipe until an end surface of the inner pipe fits on the stop 5. For fixing of the inner pipe, on the shoulder 4 there are catch projections 7 which lock to a recess in the inner pipe in the mounted state.

FIG. 3 shows another exemplary embodiment of a sealing system 1 in a cutaway side view. In the outer periphery of the base body 2, there is a groove 8, a sealing body 3 being located in the groove 8. The groove 8 is made to run peripherally in a ring-shape in an outer periphery of the base body 2. The sealing body 3 in this exemplary embodiment is located as a separate component on the base body 2, specifically as a separate sealing body 3—made as a gasket—it is inserted into the groove 8 of the base body 2 and held by form-fit by the flanks of the groove 8. The sealing body 3 has a sealing surface 9. The sealing surface 9 in the mounted state of the sealing system 1 flatly adjoins the inner periphery of the outer pipe, forming a seal, and seals the annular gap which arises between the inner pipe and the outer pipe.

The sealing body 3 according to FIG. 3 has an essentially rectangular cross section, as a result of which advantageously the sealing surface 9 arises from the width of the sealing body 3. The width of the sealing body 3 and the width of the sealing surface 9 in this exemplary embodiment correspond roughly to one third of the width of the base body 2. The height of the sealing body 3 corresponds roughly to half its width.

FIG. 4 shows the exemplary embodiment according to FIG. 3 in a perspective view. An inner pipe can be locked with the catch projections 7 and can be inserted into the shoulder 4 in the inner periphery of the base body 2 of the sealing system 1. The outer contour of the sealing body 3 with its sealing surface 9 is roughly 0.2 mm larger than the inner contour of the outer pipe so that in the mounted state the material of the sealing body 3, especially specifically the sealing surface 9, is forced away to the left and right by the contact of the outer pipe, as a result of which reliable sealing arises. The outer periphery of the base body 2 which remains next to the groove 8 is used as a spacer and for stabilization between the inner pipe and the outer pipe.

Figure 5:
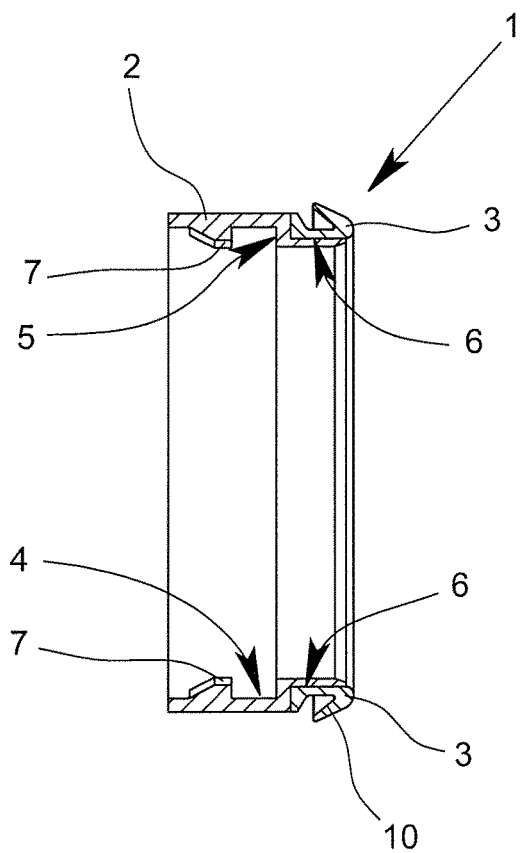
FIG. 5 is a sectional side view of another exemplary embodiment.

FIG. 5 shows another exemplary embodiment of a sealing system 1 in a cutaway side view. In the shoulder 6 of the base body 2 there is a sealing body 3 which has a flexible sealing lip 10. The flexible sealing lip 10 is sloped in the direction of the base body 2 proceeding from the end region which is shown at the right in FIG. 5 and in the radial direction has a decreasing material thickness. Additionally, as also shown in FIG. 5, the sealing body 3 projects axially beyond the base body 2 so as to form an axial end of the sealing system. The outer contour of the sealing body 3, especially specifically the sealing lip 10, also running peripherally in this exemplary embodiment, is roughly 0.2 mm larger than the inner contour of the outer pipe so that the sealing lip 10 is pressed to the inside by the inner contour of the outer pipe in the mounted state, as a result of which the sealing lip 10 flexibly adjoins the inner contour of the outer pipe and implements reliable sealing. The base body 2 is produced as polyethylene in this exemplary embodiment, while the sealing lip is produced from a rubber.

Figure 6:
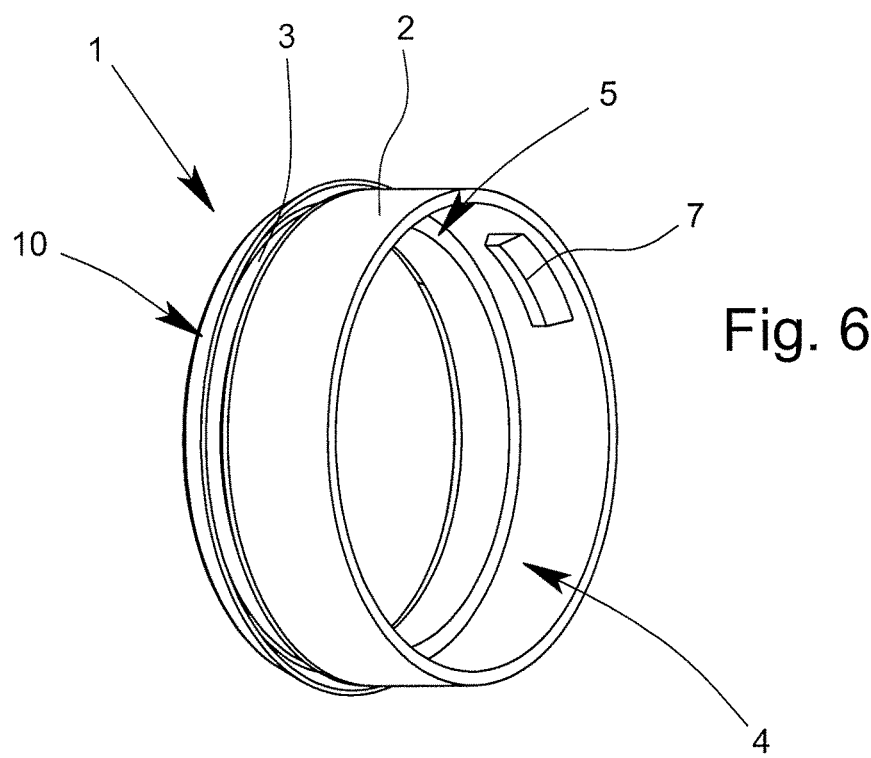
FIG. 6 is a perspective view of the embodiment according to FIG. 5.

FIG. 6 shows the exemplary embodiment according to FIG. 5 in a perspective view. This sealing system 1 with its shoulder 4 in the inner periphery of the base body 2 can also be slipped onto an inner pipe so that the inner pipe is pushed into the base body 2 until it reaches the stop 5 and is locked with the catch projections 7. The sealing lip 10 from an end region in the direction of the base body 2. The base body 2 has an essentially round shape.

The exemplary embodiment according to FIGS. 1 & 2 also has a flexible sealing lip 10 which is located at an angle of 90° relative to the bottom of the shoulder 6 or to the outer surface of the base body. The sealing lip 10 tapers in the radial direction—the material thickness decreases continuously, as a result of which advantageous flexibility is achieved. On the side facing away from the base body 2 the sealing lip 10 has a slope which causes the reduction of the material thickness. The outer contour of the sealing body 2, especially specifically the sealing lip 10, is roughly 0.2 mm larger than the inner contour of the outer pipe so that the sealing lip 10 in the mounted state placed in the outer pipe yields flexibly, preferably in the direction of the base body 2.

What is claimed is:

1. A sealing system for sealing between an inner pipe and an outer pipe of a telescoping vacuum cleaner suction pipe, comprising:
   at least one annular base body of a first material, and
   an annular sealing body of a second material on the base body, said sealing body having a flexible sealing lip and being located at and projecting beyond an axial end of the base body so as to form a free end of the sealing system,
   wherein the sealing lip is sloped in a radial direction and decreases in thickness in a direction toward a free end thereof.

2. The sealing system as claimed in claim 1, wherein the sealing body is located at least partially on the outer periphery of the base body.

3. The sealing system as claimed in claim 1, wherein the base body has at least one shoulder at an outer periphery thereof, and wherein the sealing body is located in the shoulder.

4. The sealing system as claimed in claim 1, wherein the sealing body is a separate part on the base body.

5. The sealing system as claimed in claim 1, wherein the sealing body is attached to the base body by having been injection molded thereon.

6. The sealing system as claimed in claim 1, wherein the sealing body has a sealing surface with a width between 0.5 mm and 3.0 mm.

7. The sealing system as claimed in claim 1, wherein the sealing body has an essentially rectangular transverse cross section.

8. The sealing system as claimed in claim 1, wherein a largest outer contour of the sealing body is larger than a largest outer contour of the base body.

9. The sealing system as claimed in claim 1, wherein the sealing body is formed of a softer material than the base body.

10. The sealing system as claimed in claim 9, wherein the base body is made of polypropylene (PP) or polyethylene (PE) and the sealing body is made one of a material selected from the group consisting of a foam, a textile, a natural or synthetic rubber and a silicone.

11. The sealing system as claimed in claim 1, wherein the sealing body is provided with an internal stop shoulder for limiting insertion of vacuum cleaner suction pipe therein.

12. The sealing system as claimed in claim 1, wherein the sealing body is provided with at least one catch projection for engaging in a corresponding opening in a vacuum cleaner suction pipe inserted into the base body.

13. The sealing system as claimed in claim 9, wherein the sealing body is provided with at least one catch projection for engaging in a corresponding opening in a vacuum cleaner suction pipe inserted into the base body.

* * * * *